United States Patent
Kuroda

(10) Patent No.: US 8,368,791 B2
(45) Date of Patent: Feb. 5, 2013

(54) IMAGING APPARATUS

(75) Inventor: Yukihiro Kuroda, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 13/096,202

(22) Filed: Apr. 28, 2011

(65) Prior Publication Data

US 2011/0285868 A1 Nov. 24, 2011

(30) Foreign Application Priority Data

May 18, 2010 (JP) .................................. 2010-114347

(51) Int. Cl.
*H04N 5/335* (2011.01)
(52) U.S. Cl. ..................................... 348/302; 348/230.1
(58) Field of Classification Search .......................... None
See application file for complete search history.

(56) References Cited

U.S. PATENT DOCUMENTS

| 7,742,092 | B2* | 6/2010 | Koseki et al. ................. 348/300 |
| 2010/0194954 | A1* | 8/2010 | Tejada-Gomez .............. 348/308 |

FOREIGN PATENT DOCUMENTS

| JP | 2007-208805 A | 8/2007 |
| JP | 2008-042289 A | 2/2008 |

* cited by examiner

*Primary Examiner* — Chieh M Fan
*Assistant Examiner* — Wesley J Chiu
(74) *Attorney, Agent, or Firm* — Fitzpatrick, Cella, Harper & Scinto

(57) ABSTRACT

An imaging apparatus includes: a pixel signal read out unit for reading out a pixel signal and a reference signal, and for holding the read out pixel signal or the reference signal in a holding capacitor; a selection switch for successively selecting signals stored row by row in the holding capacitor of pixel signal read out unit, and for outputting the selected signal to any one of a plurality of signal lines; reset switches for resetting the plurality of signal lines to a reset voltage; a multiplexer for selectively outputting the signals of the signal lines; and a control unit for controlling the multiplexer and the selection switch. The control unit performs control based on the reference signal read out according to a period longer than a period according to which the pixel signal is read out.

4 Claims, 7 Drawing Sheets

IMAGING APPARATUS

BACKGROUND OF THE INVENTION

1. Field of the Invention

The present invention relates to an imaging apparatus.

2. Description of the Related Art

In recent years, the number of pixels of an image input apparatus, such as a digital still camera and a digital video camera, has been increased in order to improve image quality of a taken image. Accordingly, it is an object to read out a sensor signal at high speed. As resolution means, a sensor is disclosed that divides a pixel signal for read-out signal outputting lines and multiplexingly outputs signals from the signal outputting lines (see Japanese Patent Laid-Open No. 2008-42289). There is a problem in that, in a case of outputting a sensor signal at high speed, the output signal is susceptible to influences due to surroundings and unevenness of solid imaging apparatuses. As resolution means, an imaging apparatus is disclosed that outputs a reference signal during an image blanking period and adjusts sampling timing of sensor output signals (see Japanese Patent Laid-Open No. 2007-208805).

However, in Japanese Patent Laid-Open No. 2007-208805, in a case of multiplexingly outputting sensor signals from signal outputting lines, only a signal level is output. Accordingly, there is a problem in that it cannot be determined whether an amplitude of the reference signal is in an appropriate state or not. Further, there is another problem in that, since means for adjusting sampling timing of the sensor output signal is required, an image signal processing unit becomes complex, for example, thereby increasing cost.

SUMMARY OF THE INVENTION

The present invention has been made in view of the above problems. It is an object of the present invention to provide an imaging apparatus that can acquire a signal with appropriate timing and amplitude and form a high quality image even in a case of multiplexingly outputting signals at high speed.

The present invention provides an imaging apparatus comprising: a pixel unit wherein a plurality of pixels each including a photoelectric conversion element for generating a pixel signal by a photoelectric conversion are arranged in a matrix; a reference signal outputting unit for outputting a reference signal; a pixel signal reading unit for reading the pixel signal though a pixel signal switch from the pixel unit row by row, for reading the reference signal though a reference signal switch from the reference signal outputting unit, and for holding the read out pixel signal or the reference signal in a holding capacitor; a selection switch for successively selecting the pixel signals or the reference signal stored row by row in the holding capacitor, and for outputting the selected pixel signal to any of a plurality of signal lines; a reset switch for resetting the plurality of signal lines to a reset voltage; a multiplexer for selectively outputting the pixel signals or the reference signal of the signal lines; and a control unit for controlling the multiplexer and the reset switch, by changing a phase of a control pulse of the multiplexer, by changing a phase of a control pulse of the multiplexer, or by changing a pulse width of a control pulse of the selection switch, wherein the control unit controls amplitudes of the reset voltage and the reference signals to be predetermined values, based on the reference signal read out according to a frequency lower than a frequency according to which the pixel signal is read out from the multiplexer.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
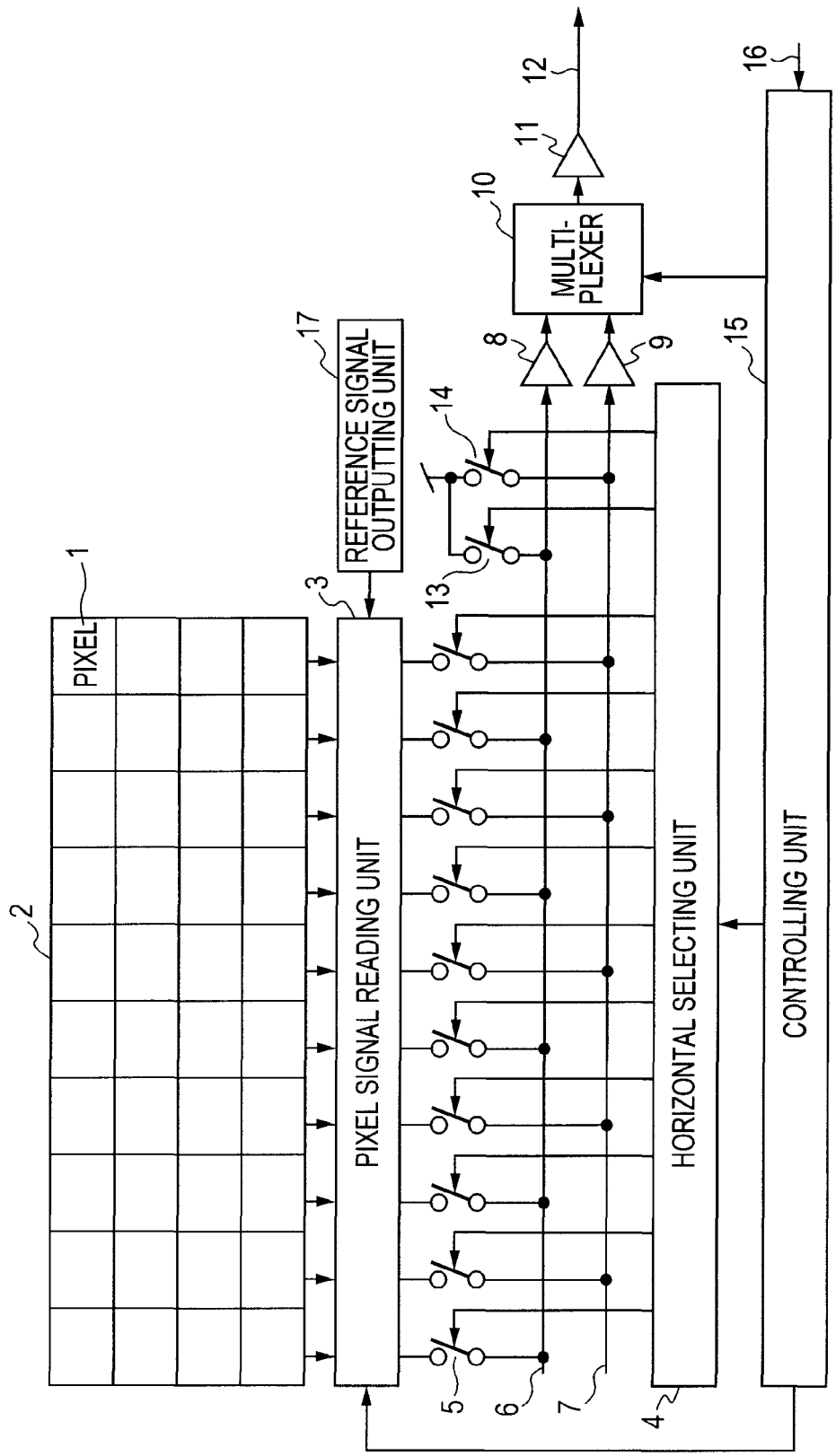
FIG. 1 is a block diagram of an imaging apparatus of an embodiment of the present invention.

FIG. 1 is a block diagram illustrating an example of configuration of an imaging apparatus 100 according to an embodiment of the present invention. The imaging apparatus 100 is capable of high speed output by outputting output signals from a plurality of horizontal signal outputting lines 6 and 7 via a multiplexer 10. A plurality of pixels 1 is arranged in a two-dimensional matrix in a pixel unit 2. The pixel 1 includes a photoelectric conversion element that generates a signal according to photoelectric conversion. With respect to the arrangement of the pixels 1, vertical transfer lines for reading out charges accumulated in each row of the photoelectric conversion elements are arranged for respective columns to simultaneously read out a line of pixel signals. The pixel signal read out unit 3 holds one or more lines of signals read out from the pixel unit 2. The signals of respective columns held in the pixel signal read out unit 3 are successively read out by the horizontal selecting unit 4 via selection switches 5 into the horizontal signal outputting lines 6 and 7. The signals read out into the horizontal signal outputting lines 6 and 7 are amplified by amplifiers 8 and 9, respectively, and subsequently input into the multiplexer 10. The multiplexer 10 alternately selects signals output from the amplifiers 8 and 9 in time series and outputs the selected signals. The signals output from the multiplexer 10 are amplified by an amplifier 11 and then output to the outside via an output line 12. The horizontal selecting unit 4 turns on reset switches 13 and 14 on every time when each line of signals is read out and thereby the horizontal signal outputting lines 6 and 7 are reset to a certain reset voltage. The reset switches 13 and 14 resets the horizontal signal outputting lines 6 and 7 to the reset voltage. The control unit 15 supplies pulses required to drive the pixel signal read out unit 3, the horizontal selecting unit 4 and the multiplexer 10. Further, the control unit 15 has a function of changing the widths and phases of pulses required to drive the horizontal selecting unit 4 and multiplexer 10 based on signals appeared in the output line 12. The control unit 15 receives information required for changing from the outside via a control unit input line 16. A reference signal outputting unit 17 outputs the reference signal instead of the pixel signal to the pixel signal read out unit 3 in order to cause the pixel signal read out unit 3 to hold a predetermined reference signal. The reference signal held in the pixel signal read out unit 3 can be output to the output line 12 by driving the horizontal selecting unit 4 and the multiplexer 10 as with the case of reading out the pixel signal.

Figure 2:
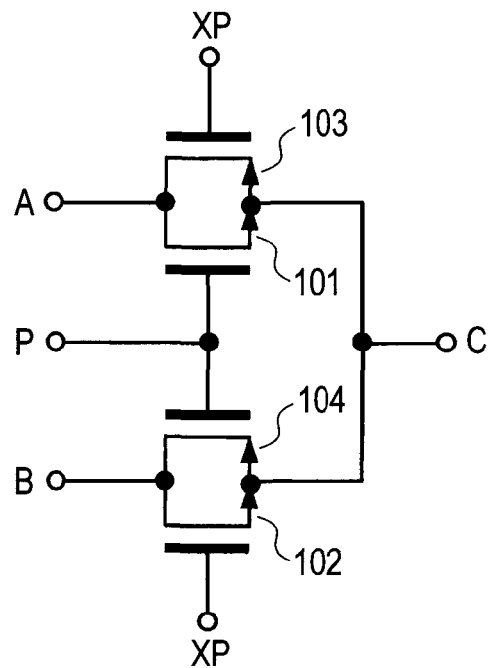
FIG. 2 is a circuit diagram illustrating a multiplexer of the imaging apparatus of the embodiment of the present invention.

Next, referring to FIGS. 2 to 5, output operation of the multiplexer 10 will be described. FIG. 2 is a diagram of a configuration of the multiplexer 10. The multiplexer 10 includes n-type MOS transistors 101 and 102 and p-type MOS transistors 103 and 104. In FIG. 2, a terminal A and a terminal B are connected to output terminals of the amplifiers 8 and 9, respectively, and a terminal C is connected to an input terminal of the amplifier 11. A terminal P and a terminal XP are supplied with pulses required for multiplexing from the control unit 15. Pulses input into the terminal P and the terminal XP have a mutually inverse relationship. The multiplexer 10 successively selects the amplified signals from the horizontal signal outputting lines 6 and 7 in time series and outputs the selected signals.

Figure 3:
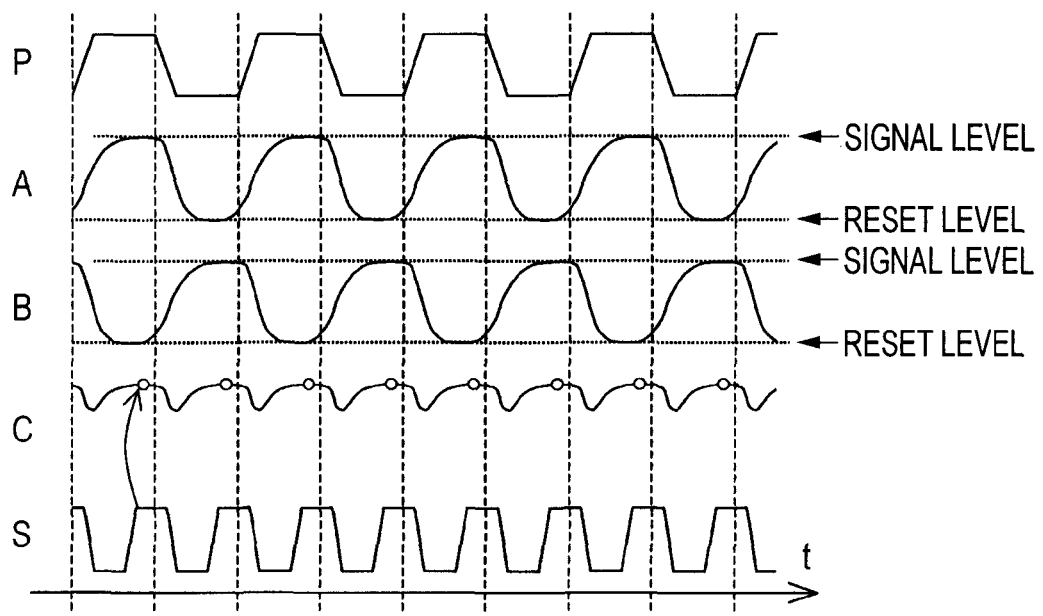
FIG. 3 is a timing chart of a multiplexing operation of the imaging apparatus of the embodiment of the present invention.

FIG. 3 is a timing chart illustrating a relationship between input and output signals of the multiplexer 10 during multiplexing operation. In FIG. 3, pulses P are input into the terminal P; waveforms A and B are of signals input into the terminals A and B, respectively; and a waveform C is of a signal output to the terminal C. During the pulse P is at low level (Low), the reset switch 13 resets the horizontal signal outputting line 6 to the reset voltage. During the pulse P is at high level (High), the reset switch 14 resets the horizontal signal outputting line 7 to the reset voltage. FIG. 3 illustrates a case of driving the horizontal selecting unit so as to read out the signal held in the pixel signal read out unit 3 into the horizontal signal outputting line 6 during the terminal P is at high level and to read out the signal held in the pixel signal read out unit 3 into the horizontal signal outputting line 7 during the terminal P is at low level. Accordingly, the terminal A reaches the level of the signal held in the pixel signal read out unit 3 while the terminal P is at high level, and reaches the reset level (reset voltage) of the horizontal signal outputting line 6 while the terminal P is at low level. Likewise, the terminal B reaches the level of the signal held in the pixel signal read out unit 3 while the terminal P is at low level, and reaches the reset revel of the horizontal signal outputting line 7 while the terminal P is at high level. When the terminal P becomes high level, the transistors 101 and 103 are turned on, the transistors 102 and 104 are turned off and the terminal C becomes the signal level identical to that of the terminal A. On the other hand, when the terminal P becomes low level, the transistors 101 and 103 are turned off, the transistors 102 are 104 turned on and the terminal C becomes the signal level identical to that of the terminal B. As a result, the output waveform after multiplexing becomes a state as with the terminal C; when the timing pulse for externally sampling the output signal of the imaging apparatus becomes a state as with the pulse S, signal levels illustrated with open dots on the waveform C are sampled.

Figure 4:
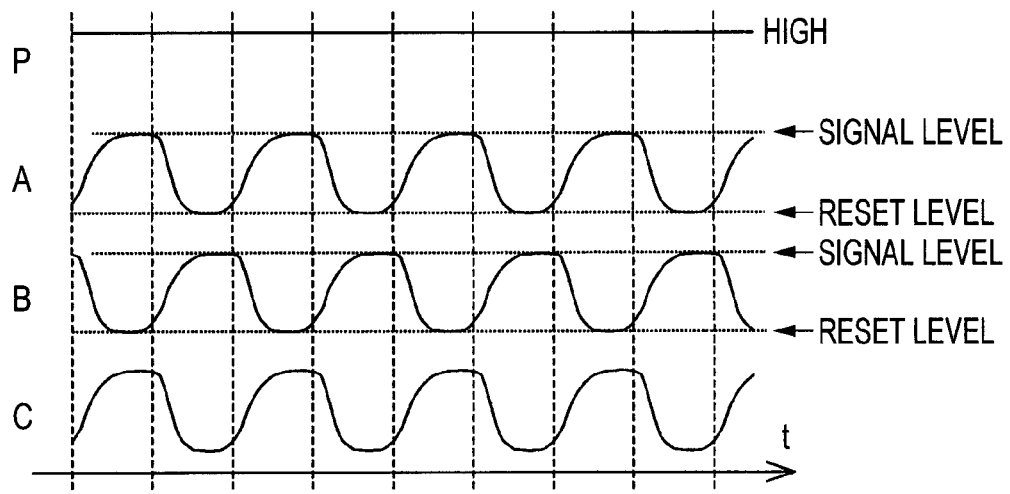
FIG. 4 is a timing chart when the imaging apparatus of the embodiment of the present invention stops multiplexing.
Figure 5:
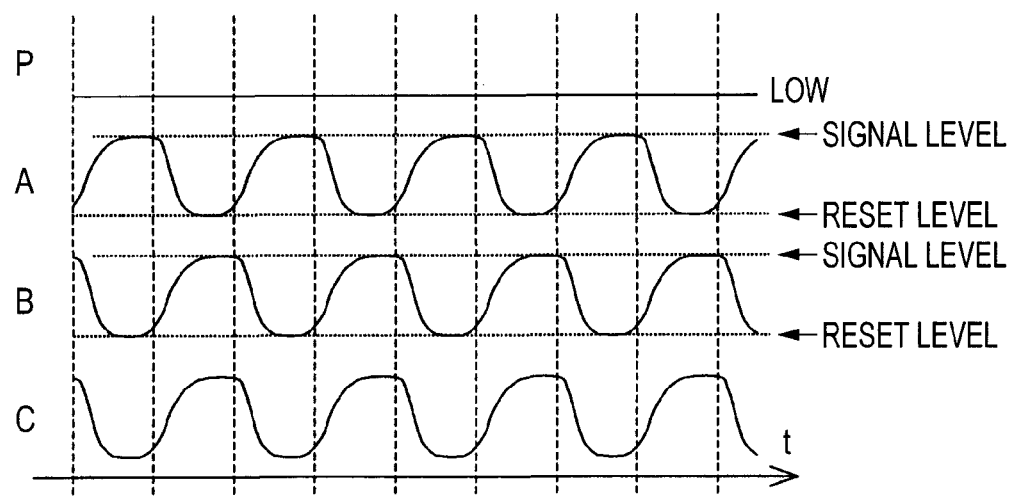
FIG. 5 is a timing chart when the imaging apparatus of the embodiment of the present invention stops multiplexing.

FIG. 4 illustrates a relationship between input and output of the multiplexer 10 when the pulse input into the terminal P is at a fixed high level. In this case, the multiplexing operation is stopped, the waveform input into the terminal A is output to the terminal C. FIG. 5 illustrates a relationship between input and output of the multiplexer 10 when the pulse input into the terminal P is at the fixed low level. In this case, the multiplexing operation is stopped, the waveform input into the terminal B is output to the terminal C. As described above, the reference signal can be output by holding the reference signal from the reference signal outputting unit 17 instead of the pixel signal in the pixel signal read out unit 3. However, if the multiplexing operation outputs the reference signal, there is a case in which the pulse for driving the horizontal selecting unit 4 and the multiplexer based on the reference signal cannot be adjusted correctly.

Figure 6:
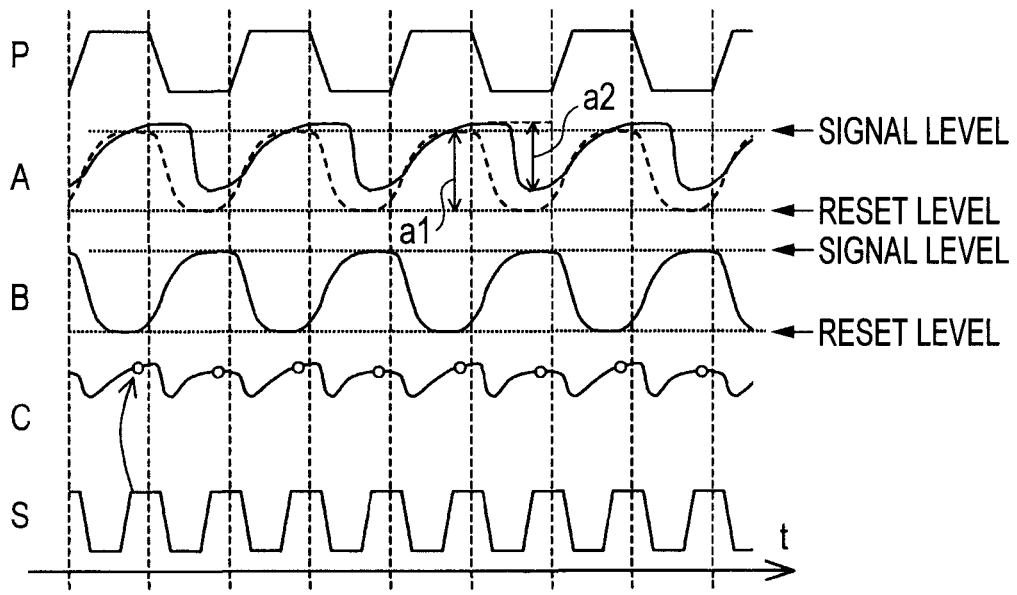
FIG. 6 is a timing chart illustrating signal degradation during multiplexing operation.

FIG. 6 is a timing chart for illustrating an example thereof. The correspondence between waveforms in FIG. 6 and the respective waveforms in FIG. 2 is analogous to that in FIG. 3. Here, a waveform of A illustrated with a broken line illustrates a case of appropriately outputting the reference signal. A waveform of A illustrated with a solid line illustrates a case in which the next reference signal is output before complete reset owing to short time period for resetting the horizontal signal outputting line 6. This can occur in a case in which a selection period of the selection switch 5 is long and a reset period of the horizontal signal outputting line is short. A waveform B is of an assumed case of outputting an appropriate reference signal. In FIG. 6, as to the waveform C after multiplexing, the potentials of the reference signals of the sampled waveforms A and B are substantially identical to each other. However, in actuality, since an appropriate reference signal is not output as the waveform A, an amplitude a1 of the appropriate reference signal and an amplitude a2 of an inappropriate reference signal cannot be distinguished from each other. Accordingly, adjustment of the pulse for driving the horizontal selecting unit 4 and multiplexer 10 based on the reference signal cannot be performed correctly. Therefore, the reference voltage (signal level) of the reference signal and the reset voltage (reset level) can be acquired by stopping the multiplexing operation as described above, thereby allowing acquisition of the amplitude value of the reference signal. As a result, this acquisition allows correct adjustment of the pulse for driving the horizontal selecting unit 4 and the multiplexer 10 based on the reference signal and also allows forming a high quality image. This embodiment has described the case in which the signals read out into the horizontal signal outputting lines 6 and 7 are amplified by the amplifiers 8 and 9, respectively, and input into the multiplexer 10. However, the horizontal signal outputting lines 6 and 7 may directly be connected to the multiplexer 10.

Figure 7:
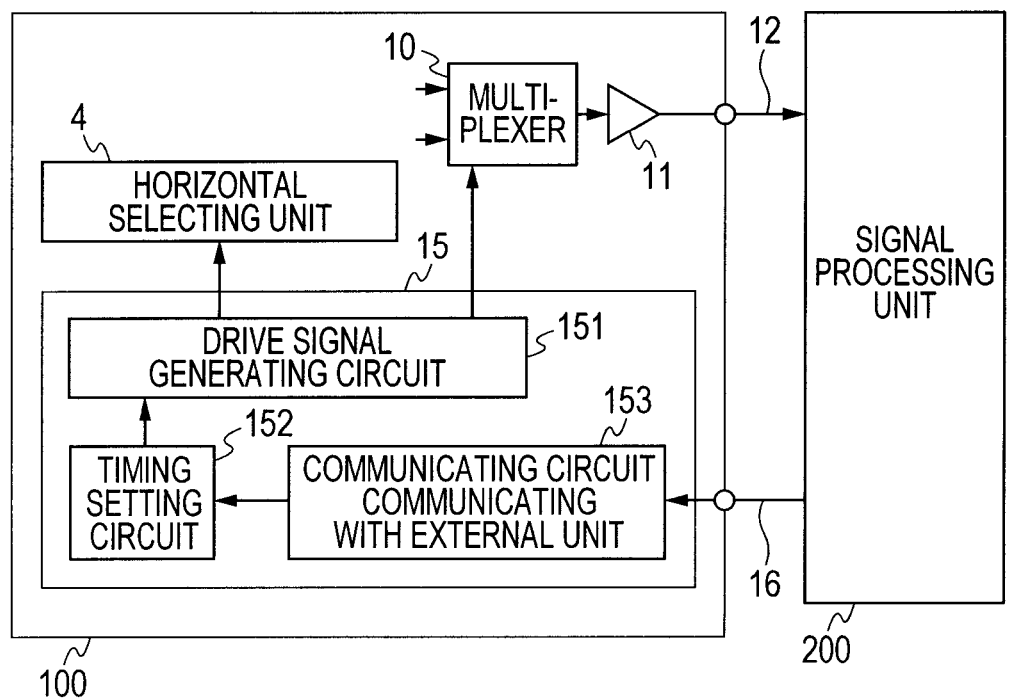
FIG. 7 is a block diagram illustrating a control unit of the imaging apparatus of the embodiment of the present invention.

Next, referring to FIGS. 7 and 8, a method will be described of adjusting the pulse for driving the horizontal selecting unit 4 and the multiplexer 10 based on the reference signal. FIG. 7 illustrates an imaging apparatus 100 and a signal processing unit 200 that receives signals from the imaging apparatus and generates an image signal. The horizontal selecting unit 4, the multiplexer 10, the amplifier 11 and the control unit 15 in FIG. 7 are substantially identical to those in FIG. 1. Note that only elements of the imaging apparatus 100 necessary for explanation are illustrated in FIG. 7 for the sake of simplicity. Further, in FIG. 7, a drive signal generating circuit 151, which is for generating pulses required to drive the horizontal selecting unit 4 and the multiplexer 10, generates the pulses based on information received from the timing setting circuit 152. The timing setting circuit 152 can change a set value of timing by communicating with the signal processing unit 200 according to the external communication circuit 153.

Figure 8:
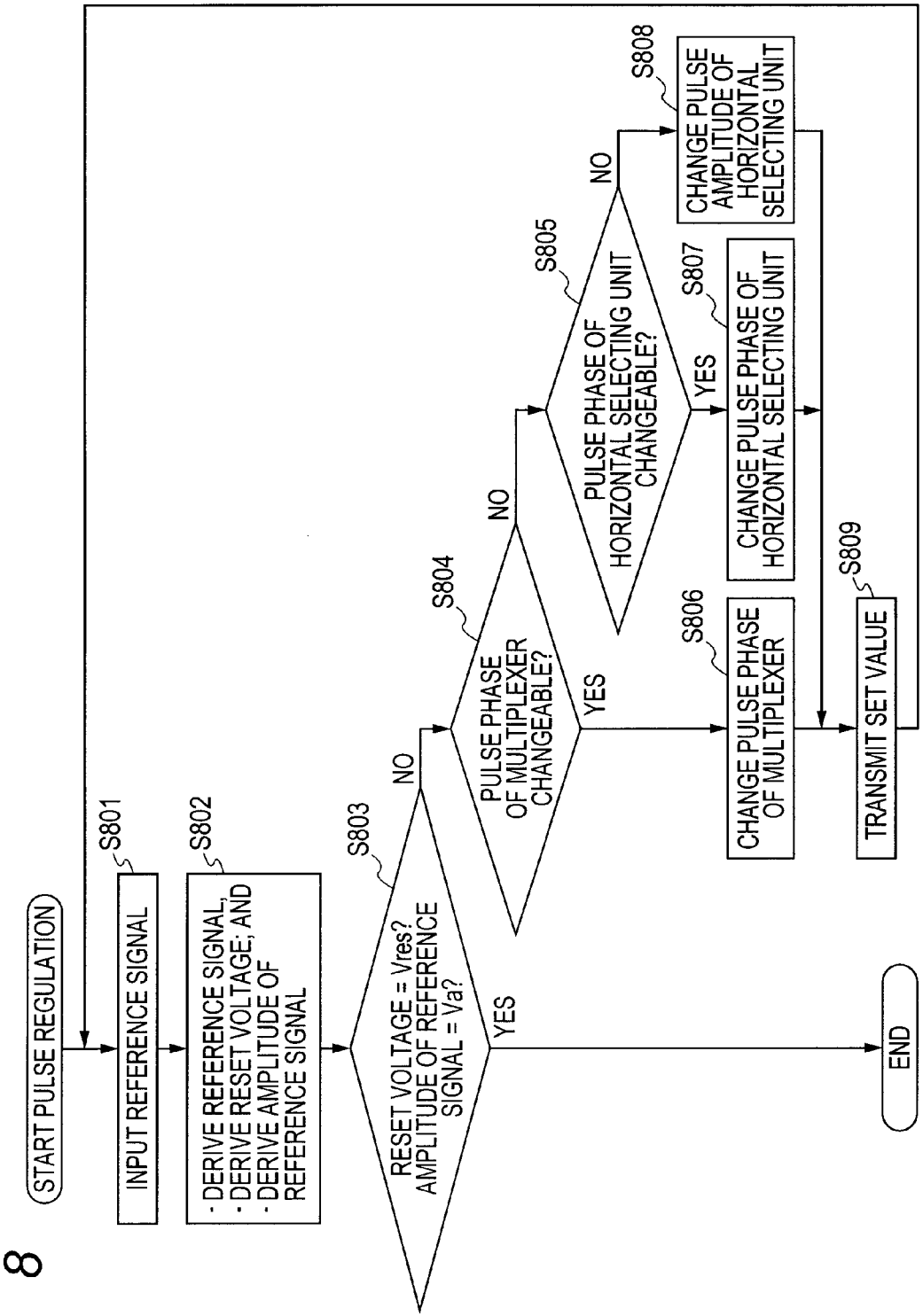
FIG. 8 is a flowchart illustrating a timing adjustment of the embodiment of the present invention.

FIG. 8 illustrates a flow in which the signal processing unit 200 receives the reference signal and transmits the set value required to adjust the timing of the imaging apparatus 100. In step S801, the signal processing unit 200 receives the reference signal from the imaging apparatus 100 via the output line 12. Next, in step S802, the signal processing unit 200 derives the reference voltage Vref of the received reference signal, the reset voltage and the amplitude of the reference signal. Next, in step S803, the signal processing unit 200 determines whether the reset voltage and the amplitude of reference signal are predetermined values Vres and Va or not. If the values do not match with each other, the processing proceeds to step S804 for adjusting the pulse. If the values match with each other, the signal processing unit 200 finishes the timing adjustment processing. In step S804, the signal processing unit 200 checks wither the pulse phase of the multiplexer 10 is changeable or not. If changeable, the processing proceeds to step S806. If not changeable, the processing proceeds to step S805. In step S805, the signal processing unit 200 determines whether the pulse phase of the horizontal selecting unit 4 is changeable or not. If changeable, the processing proceeds to step S807. If not changeable, the processing proceeds to step S808. In step S806, the signal processing unit 200 issues an instruction of changing the pulse phase value of the multiplexer 10 and the processing proceeds to step S809. In step S807, the signal processing unit 200 issues an instruction of changing the pulse phase value of the horizontal selecting unit 4 and the processing proceeds to step S809. In step S808, the signal processing unit 200 issues an instruction of changing the pulse width value of the horizontal selecting unit 4 and the processing proceeds to step S809. In step S809, the signal processing unit 200 transmits set values responsive to the instructions to the imaging apparatus 100 via the control unit input line 16. The pulses are adjusted in an order of changing the phase of the pulse for driving the multiplexer 10, changing the phase of the pulse of the horizontal selecting unit 4 and then changing the width of the pulse of the horizontal selecting unit 4, as described above. On each time, the reset voltage and the amplitude of the reference signal are verified with respect to the reference signal reflected into the imaging apparatus 100. These pulses are changed by transmitting information required to change the timing setting circuit 152 from the signal processing unit 200 via the control unit input line 16. The timing setting circuit 152 changes the set value of timing based on the information received from the external communication circuit 153. The drive signal generating circuit 151 receives the set value of timing from the timing setting circuit 152, and generates pulses required to drive the horizontal selecting unit 4 and the multiplexer 10. This allows changing the phase of the pulse for driving the multiplexer 10, changing the phase of the pulse of the horizontal selecting unit 4 or the width of the pulse of the horizontal selecting unit 4. In step S803, if the reset voltage and the amplitude of reference signal match with the predetermined values Vres and Vs, respectively, the pulse adjustment processing is finished.

As described above, the control unit 15 receives a control signal from a control unit input line 16 generated by the signal processing unit 200 according to the output signal from the multiplexer 10. The control unit 15 controls the multiplexer 10 and selection switch 5 by changing the phase of the control pulse of the multiplexer 10, the phase of the control pulse of the selection switch 5 or the width of the control pulse of the selection switch 5 responsive to the control signal. The control signal from the control unit input line 16 is generated by the signal processing unit 200 such that the control unit 15 controls the reset voltage and the amplitude of the reference signal to be prescribed values based on the output signal from the multiplexer 10. The imaging apparatus 100 adjusts the pulse in the imaging apparatus 100 by receiving an instruction of changing the pulse setting from the signal processing unit 200. Thus, degradation of the output signal due to unevenness among individual imaging apparatuses 100 and change in temperature can be accommodated by the imaging apparatus 100, thereby negating the need to adjust the sampling pulse in the signal processing unit 200. Accordingly, the signal processing unit 200 can be simplified, thereby allowing cost reduction.

Figure 9:
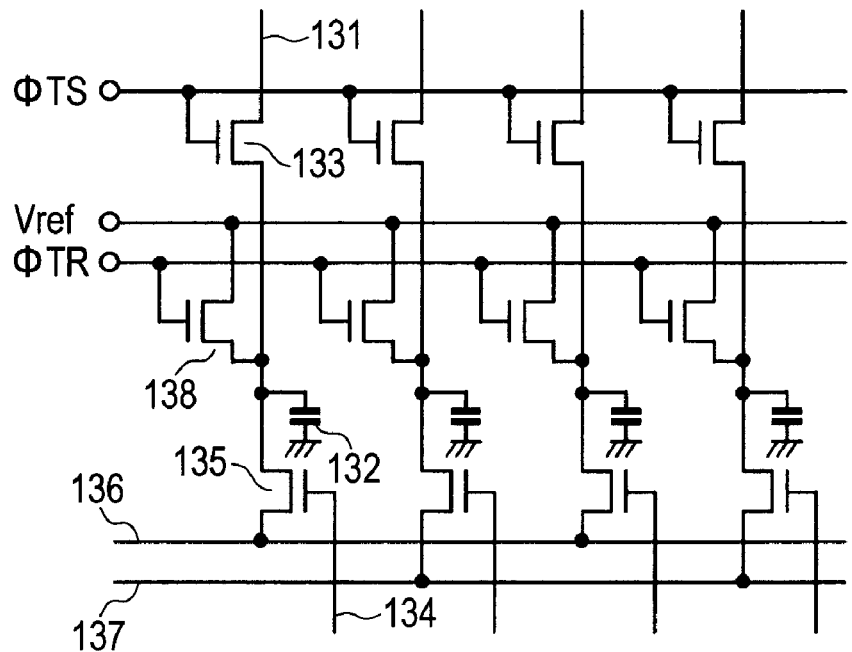
FIG. 9 is a circuit diagram illustrating a pixel read out unit of the embodiment of the present invention.

Next, referring to FIG. 9, a method is illustrated of holding the reference signal in the pixel signal read out unit 3. FIG. 9 is a circuit diagram illustrating an example of a configuration of the pixel signal read out unit 3. A vertical signal line 131 is commonly connected to the pixel 1 on each column. The signal from the pixel is output to the vertical signal line 131. A holding capacitor 132 holds the pixel signal. A pulse φTS turns on the transistor 133 and thereby the signal output to the vertical signal line 131 is held in the holding capacitor 132. The transistor 135 corresponds to the selection switch 5 in FIG. 1. The horizontal signal outputting lines 136 and 137 correspond to the horizontal signal outputting lines 6 and 7 in FIG. 1, respectively. An output 134 from the horizontal selecting unit 4 turns on the transistor 135 and thereby the signals held in the holding capacitor 132 are read out by the horizontal signal outputting lines 136 and 137. The reference signal Vref is a predetermined voltage for reference, and supplied from the reference signal outputting unit 17. A pulse φTR is in a control line for controlling supply of the reference signal Vref. The pulse φTR turns on the transistor 138 and thereby the reference signal Vref is held in the holding capacitor 132. The pixel signal read out unit 3 causes the transistor (pixel signal switch) 133 to read out the signals of the pixel unit 2 on a row by row basis, and causes the transistor (reference signal switch) 138 to read out the reference signal Vref from the reference signal outputting unit 17. The pixel signal read out unit 3 holds the signals read out from the pixel unit 2 or the reference signal Vref in the holding capacitor 132. The transistor (selection switch) 135 successively selects the signals held in units of rows in the holding capacitor 132 of the pixel signal read out unit 3, and outputs the selected signals to any one of the signal outputting lines 136 and 137. As described above, the reference signal Vref is read out from the pixel signal read out unit 3 to the output line 12 in the same path as with the case of reading out the pixel signal. Accordingly, the pulse for driving the horizontal selecting unit 4 and the multiplexer 10 based on the reference signal Vref can accurately be adjusted, thereby allowing formation of a high quality image.

Figure 10:
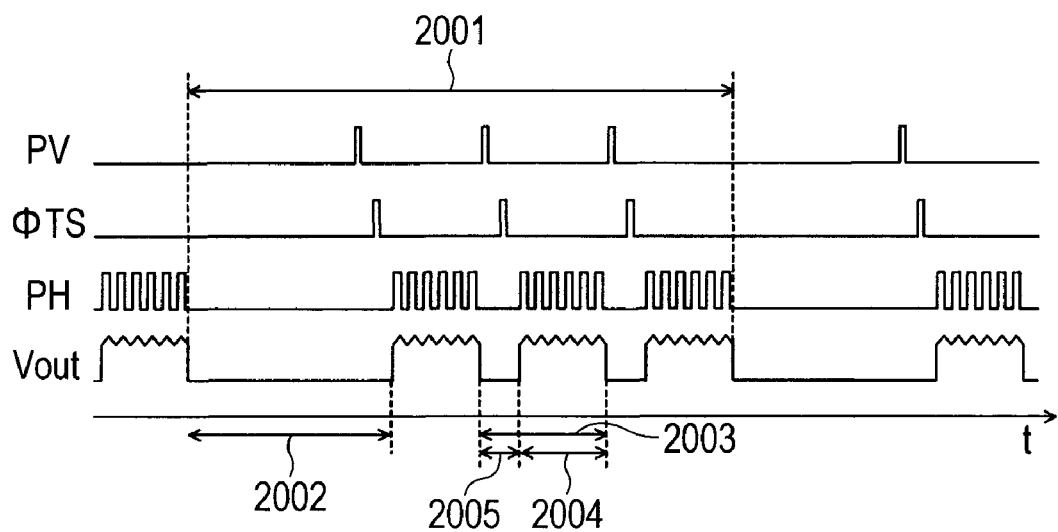
FIG. 10 is a timing chart illustrating an imaging period of the imaging apparatus of the embodiment of the present invention.

Next, referring to FIGS. 10 and 11, a period for outputting the reference signal will be described. FIG. 10 is a timing chart illustrating an image output period and an image blanking period of the imaging apparatus 100. In FIG. 10, a pulse PV is for selecting a row of the pixel unit 2. During the pulse PV is at high level, a row is selected. During the pulse φTS is at high level, the pixel signal from the pixel unit 2 is held in the pixel signal read out unit 3. A drive pulse PH is for driving the horizontal selecting unit 4. At the timing on which the drive pulse PH is at high level, the selection switches 5 are successively turned on, and the signals accumulated in the pixel signal read out unit 3 are successively read out to the horizontal signal outputting lines 6 and 7. A signal Vout schematically illustrated therein denotes output from the output line 12. FIG. 10 illustrates a vertical scanning period 2001, a vertical blanking period 2002, a horizontal scanning period 2003, a horizontal imaging period 2004 and a horizontal blanking period 2005. Here, the periods 2002 and 2005 correspond to image blanking periods. In order to output the reference signal without impeding image signal output, the reference signal is to be output in the image blanking period. The multiplexer 10 outputs the signal of the pixel unit 2 in the horizontal imaging period 2004, and outputs the reference signal in the image blanking period 2002 or 2005 different from the horizontal imaging period 2004.

Figure 11:
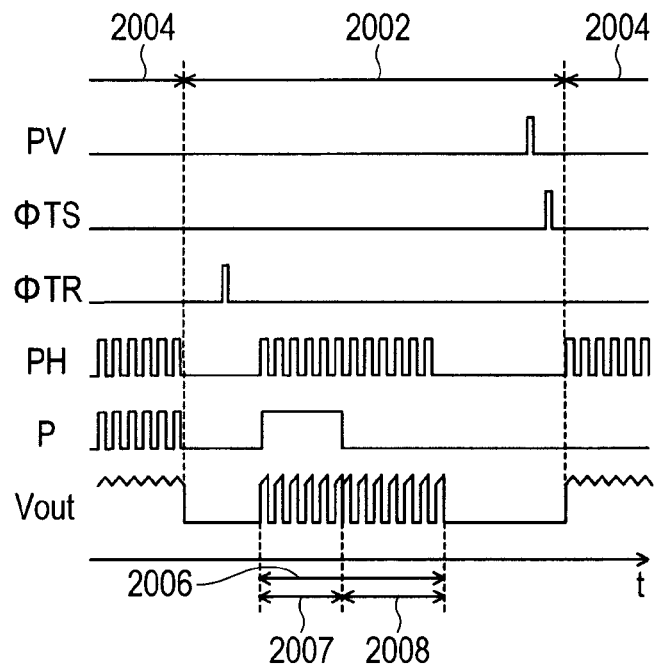
FIG. 11 is a timing chart of a reference signal outputting period of the imaging apparatus of the embodiment of the present invention.

FIG. 11 is a timing chart of a case of outputting the reference signal during the vertical blanking period 2002. In FIG. 11, sections with identical symbols are substantially identical to those in FIG. 10. A Pulse P is for driving the multiplexer 10. When pulse φTR becomes high level in the vertical blanking period 2002, the reference signal Vref is supplied from the reference signal outputting unit 17 and held in the pixel signal read out unit 3. Next, when the drive pulse PH becomes high level, the reference signal of the pixel signal read out unit 3 is output to the horizontal signal outputting lines 6 and 7. The reset switches 13 and 14 reset horizontal signal outputting lines 6 and 7 to the reset voltage, respectively, responsive to the drive pulse PH. The resetting method is substantially identical to that of FIG. 3. In FIG. 11, the reference signal Vref is output to the reference signal outputting period 2006 as the output signal Vout. Here, since the terminal P is at the fixed high level during the period 2007 in the reference signal outputting period 2006, the operation of the multiplexer 10 is stopped and the signal A in FIG. 4 is output. Next, since the terminal P is at the fixed low level in the period 2008, the signal B in FIG. 5 is output. When the pixel signal read out unit 3 holds the reference signal Vref in the holding capacitor 132, the selection switch 5 outputs the reference signal Vref of the holding capacitor 132 to the horizontal signal outputting lines 6 and 7. The multiplexer 10 successively selects the reference signal output to the horizontal signal outputting lines 6 and 7 in time series and outputs the selected signal. The multiplexer 10 selects one of the horizontal signal outputting lines 6 and 7 such that, in the case of reading out the reference signal, the reference signal and the reset signal when one of the horizontal signal outputting lines 6 and 7 is reset after the reference signal is read out are continuously output. More specifically, in the case of reading out the reference signal, the multiplexer 10 continuously selects one of the horizontal signal outputting lines 6 and 7.

As described above, the pulse can be adjusted without impeding the image signal, by outputting the reference signal in the image blanking period. Accordingly, even in the case of degradation of the output signal owing to change in temperature of the imaging apparatus 100, immediate accommodation can be made, thereby allowing acquisition of an excellent image. Further, since the path for reading out the signal is changed in the reference signal outputting period 2006, the pulse on each reading-out path can be adjusted as described above. As a result, the unevenness among the reading-out paths due to change in temperature and individual unevenness can be accommodated, thereby allowing acquisition of an excellent image.

Figure 12:
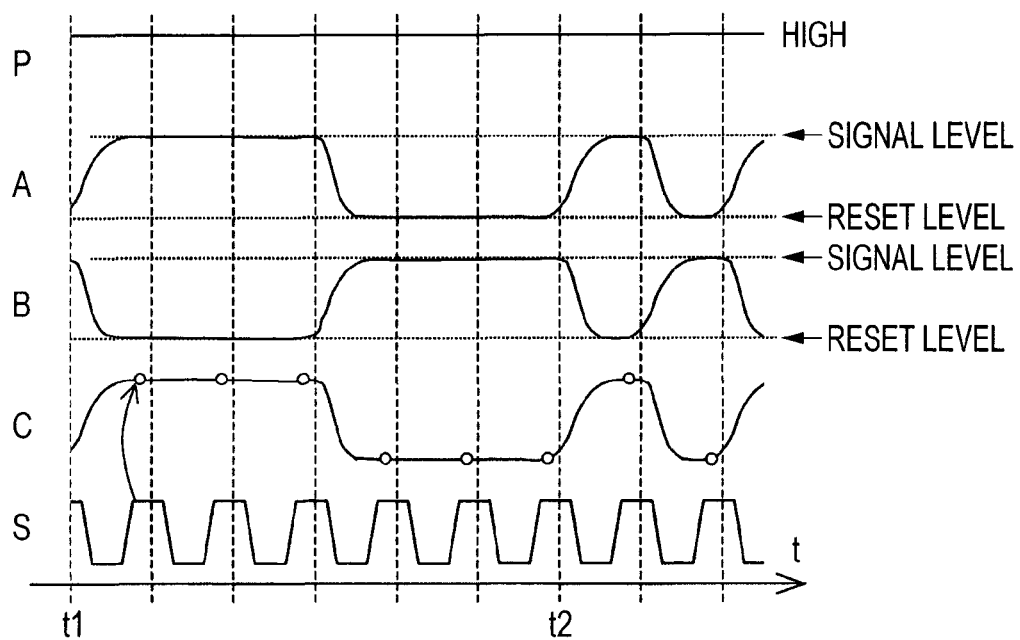
FIG. 12 is a timing chart illustrating a reference signal output from the imaging apparatus of the embodiment of the present invention.

FIG. 12 illustrates a mode of changing the frequency of the reference signal in the period of outputting the reference signal. In FIG. 12, the sign of each waveform is equivalent to that in FIG. 3. In FIG. 12, from time t1 to time t2, the reference signal is output at a frequency lower than that in the case of outputting the image signal. Next, after time t2, the reference signal is output at a frequency identical to that in the case of outputting the image signal. The period of time t1-t2 illustrates a period for resetting the horizontal signal outputting lines 6 and 7 during the reference signal is output to the horizontal signal outputting lines 6 and 7. A period after time t2 illustrates a period for resetting the horizontal signal outputting lines 6 and 7 during the signals from the pixel unit 2 is output to the horizontal signal outputting lines 6 and 7. The reset switches 13 and 14 perform the resetting such that the period of time t1-t2 is longer than the period after time t2. Accordingly, from time t1 to time t2, the reference voltage of the reference signal and the reset voltage can be sampled a plurality of times. If the frequency is sufficiently low, a reference voltage and a reset voltage without influence of responsiveness can be acquired. The control unit 15 performs control such that the amplitudes of the reset voltage and the reference signal become prescribed values based on the reference signal read out from the multiplexer 10 at a period longer than that of reading out the signals of the pixel unit 2. Accordingly, the unevenness of the reference signal outputting unit 17 can be accommodated better than the case of adjusting the pulse in comparison with the predetermined reset voltage Vres and the amplitude of the reference signal Va, thereby allowing acquisition of more excellent image.

According to this embodiment, the imaging apparatus 100 temporarily stops the multiplexer 10 when outputting the reference signal, and outputs the reference signal from the output line 12. This allows acquisition of the reset voltage of the output line 12 and the reference voltage of the reference signal from the output reference signal. As a result, the value of the amplitude of the reference signal can be acquired in comparison with the case of acquiring only the reference voltage by multiplexing output; the degrading image quality owing to insufficient reset period of the signal output to the output line 12 and phase deviation can be suppressed.

The imaging apparatus 100 includes the control unit 15 that adjusts driving of the horizontal selecting unit 4 and the multiplexer 10 based on the reference signal, and is capable of changing the width and phase of the drive pulse with respect to driving of the horizontal selecting unit 4 and the multiplexer 10. As a result, in comparison with the case of adjusting the sampling timing of the output signal from the imaging apparatus 100, for example, the signal processing unit 200 can be simplified, thereby allowing cost reduction.

The imaging apparatus 100 includes the multiplexer 10 for selecting the channel for outputting the reference signal when outputting the reference signal. Accordingly, even in a case of the imaging apparatus 100 including a plurality of output channels, timing of each output channel can be adjusted. As a result, the unevenness among the signal outputting lines owing to change in temperature and individual unevenness can be accommodated, thereby allowing suppression of degrading image quality.

In the imaging apparatus 100, the pixel signal read out unit 3 is provided with the holding capacitor 132 for holding the reference signal Vref. Accordingly, the reference signal Vref is output via the reading-out path affecting high speed output of the horizontal selecting unit 4 and the multiplexer 10. As a result, the width and phase of the drive pulse of driving of the horizontal selecting unit 4 and the multiplexer 10 can accurately be adjusted.

The imaging apparatus 100 drives the pixel signal read out unit 3 and the horizontal selecting unit 4 during the period of outputting the reference signal at a frequency lower than that of the case of outputting the pixel signal for forming an image during the first period (t1-t2). The imaging apparatus 100 then drives the pixel signal read out unit 3 and the horizontal selecting unit 4 at the frequency identical to that in the case of outputting the pixel signal for forming an image during the second period (after t2). Accordingly, in the first period, the reset voltage of the reference signal and the reference voltage can be acquired a plurality of times. As a result, the value of the amplitude of the reference signal in the first period and the value of the reference amplitude in the second period can be compared with each other. Accordingly, the width of the drive pulse and the phase of the drive pulse can correctly adjusted with reference to the horizontal selecting unit 4 and the multiplexer 10.

The above embodiments only exemplify specific cases for implementing the present invention. The technical scope of the present invention cannot be construed in a limited manner based on these embodiments. That is, the present invention can be implemented in various forms without departing from the technical thought or major characteristics.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-114347, filed May 18, 2010, which is hereby incorporated by reference herein in its entirety.

What is claimed is:

1. An imaging apparatus comprising:
   a pixel unit wherein a plurality of pixels each including a photoelectric conversion element for generating a signal by a photoelectric conversion are arranged in a matrix;
   a reference signal outputting unit for outputting a reference signal;
   a pixel signal reading unit for reading the signal of the pixel though a pixel signal switch from the pixel unit row by row, for reading the reference signal though a reference signal switch from the reference signal outputting unit, and for holding the read out signal of the pixel or the reference signal in a holding capacitor;
   a selection switch for successively selecting the signal of the pixel or the reference signal stored row by row in the holding capacitor, and for outputting the selected pixel signal to any of a plurality of signal lines;
   a reset switch for resetting the plurality of signal lines to a reset voltage;
   a multiplexer for selectively outputting the pixel signals or the reference signal of the signal lines; and
   a control unit for controlling the multiplexer and the reset switch, by changing a phase of a control pulse of the multiplexer, or by changing a pulse width of a control pulse of the selection switch, wherein
   the control unit controls amplitudes of the reset voltage and the reference signals to be predetermined values, based on the reference signal read out according to a frequency lower than a frequency according to which the signal of the pixel is read out from the multiplexer.

2. The imaging apparatus according to claim 1, wherein, when the pixel signal reading unit holds the reference signal in the holding capacitor, the selection switch outputs to the plurality of output lines the reference signal in the holding capacitor, and the multiplexer outputs successively in time series the reference signals outputted to the plurality of signal lines.

3. The imaging apparatus according to claim 1, wherein the multiplexer outputs the pixel signal in an imaging period, and outputs the reference signal in a blanking period different from the imaging period.

4. The imaging apparatus according to claim 1, wherein the reset switch performs the reset such that a period for resetting the plurality of output lines during the outputting the reference signal to the plurality of output lines is longer than a period for resetting the plurality of output lines during the outputting the signal of the pixel to the plurality of output lines.

\* \* \* \* \*